(12) United States Patent
Diehl et al.

(10) Patent No.: US 9,188,148 B2
(45) Date of Patent: Nov. 17, 2015

(54) FUNCTIONAL ELEMENT FOR ATTACHMENT TO A PLASTIC COMPONENT, A COMPONENT ASSEMBLY, A DIE BUTTON AND METHOD

(75) Inventors: Oliver Diehl, Bad Homburg v.d.H (DE); Richard Humpert, Bad Nauheim (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 925 days.

(21) Appl. No.: 13/267,003

(22) Filed: Oct. 6, 2011

(65) Prior Publication Data

US 2012/0088075 A1    Apr. 12, 2012

(30) Foreign Application Priority Data

Oct. 6, 2010  (DE) .................. 10 2010 047 636

(51) Int. Cl.
| | |
|---|---|
| F16B 37/04 | (2006.01) |
| B29C 65/50 | (2006.01) |
| B29C 65/78 | (2006.01) |
| B29C 65/00 | (2006.01) |
| F16B 37/06 | (2006.01) |
| B29C 65/48 | (2006.01) |
| F16B 11/00 | (2006.01) |
| F16B 35/06 | (2006.01) |

(52) U.S. Cl.
CPC ............ *F16B 37/048* (2013.01); *B29C 65/483* (2013.01); *B29C 65/5007* (2013.01); *B29C 65/5057* (2013.01); *B29C 65/7841* (2013.01); *B29C 66/1222* (2013.01); *B29C 66/1224* (2013.01); *B29C 66/131* (2013.01); *B29C 66/322* (2013.01); *B29C 66/474* (2013.01); *B29C 66/742* (2013.01); *F16B 37/065* (2013.01); *B29C 65/485* (2013.01); *F16B 11/006* (2013.01); *F16B 35/06* (2013.01); *Y10T 156/10* (2015.01); *Y10T 428/21* (2015.01); *Y10T 428/216* (2015.01); *Y10T 428/24479* (2015.01); *Y10T 428/24777* (2015.01); *Y10T 428/249994* (2015.04)

(58) Field of Classification Search
USPC ...................... 428/198; 411/82, 82.2, 82.3
See application file for complete search history.

(56) References Cited

U.S. PATENT DOCUMENTS 7,048,486 B2 *   5/2006   Schaty ................. 411/508
7,878,744 B2 *   2/2011   Snow et al. ........... 411/82.3
(Continued)

FOREIGN PATENT DOCUMENTS

| DE | 25 36 319 A1 | 2/1977 |
|---|---|---|
| DE | 199 35 853 A1 | 4/2000 |

(Continued)

OTHER PUBLICATIONS

German Search Report in corresponding German Patent Application No. 10 2010 047 636.6 dated Jun. 9, 2011.

(Continued)

*Primary Examiner* — Gerard Higgins
(74) *Attorney, Agent, or Firm* — Hershkovitz & Assoc., PLLC; Abraham Hershkovitz; Eugene Rzucidlo (57) ABSTRACT

A functional element of metal having a flange of larger diameter forming an attachment surface and having a centering section arranged inside the attachment surface and extending away from the flange, is characterized in that an adhesive which hardens under pressure is arranged around the centering section and adjacent to the attachment surface.

8 Claims, 10 Drawing Sheets

(56) References Cited

U.S. PATENT DOCUMENTS

| | | |
|---|---|---|
| 2006/0137166 A1 | 6/2006 | Babej |
| 2007/0048106 A1* | 3/2007 | Christ et al. .................. 411/82 |
| 2007/0292241 A1* | 12/2007 | Snow et al. .................. 411/542 |
| 2012/0087764 A1* | 4/2012 | Diehl et al. .................. 411/82.2 |

FOREIGN PATENT DOCUMENTS

| | | |
|---|---|---|
| DE | 10 2004 062 391 A1 | 7/2006 |
| DE | 10 2005 041 350 A1 | 3/2007 |
| DE | 10 2005 044 462 A1 | 3/2007 |
| DE | 10 2004 042 478 B4 | 5/2008 |
| DE | 10 2007 019 253 A1 | 11/2008 |
| DE | 10 2009 042 336 A1 | 3/2011 |
| EP | 1 116 891 A1 | 7/2001 |
| WO | WO 2006/032954 A1 | 3/2006 |

OTHER PUBLICATIONS

English language translation of German Search Report in corresponding German Patent Application No. 10 2010 047 636.6 dated Jun. 9, 2011.

* cited by examiner

FUNCTIONAL ELEMENT FOR ATTACHMENT TO A PLASTIC COMPONENT, A COMPONENT ASSEMBLY, A DIE BUTTON AND METHOD

CROSS-REFERENCE TO RELATED APPLICATIONS

This application claims priority of German Patent Application No. 10 2010 047 636.6, filed October 6, the disclosure of which is expressly incorporated by reference herein in its entirety.

FIELD OF THE INVENTION

The present invention relates to a functional element for attachment to a plastic component, to a component assembly, to a die button and to a method for the attachment of a functional element to a plastic component.

BACKGROUND OF THE INVENTION

Functional elements of metal having a flange of larger diameter which forms an attachment surface and having a centering section arranged with the attachment surface and extending away from the flange are widely used and well known for use in metallic components such as sheet metal parts. Examples can be found in the European patent specification EP 1116891 of the present applicants which describes a so-called RND nut. That is to say the functional element is formed in the named European patent specification as a nut element. There the centering section is formed as a riveting section which is deformed after or during the attachment in order to form a rivet bead.

The functional elements which enter into question can however not only be nut elements but can also be formed as bolt elements, for example as a bolt element similar to that of the German patent application with the official file reference 102004062391. The centering bolt shown there has a so-called skirt, which is ultimately also formed as a rivet section and is beaded over during the insertion of the centering bolt into a sheet metal part.

Functional elements can by all means have other forms. For example a bolt element can have a cylindrical shaft part instead of a thread which serves for the journaling of a lever, of a cable pulley or of another component. A hollow element similar to a nut element also enters into question in which a smooth bore is provided instead of a thread cylinder and serves for the journaling of a shaft. Furthermore, functional elements are known which can be formed to receive an inserted pin or a clip. In accordance with the invention, functional elements can also be designed to carry out the corresponding functions.

In the context of the endeavors to provide shape parts of low weight but of high strength, plastic components are frequently used nowadays instead of sheet metal parts, principally in the form of composite materials, such as for example plastics reinforced with glass fibers or carbon fibers, although other reinforcement materials can also be considered, normally those with high strength reinforcement fibers or fabrics formed from such fibers. Components of such plastics also frequently need to be provided with fastener elements for which a restricted selection of possibilities is already known. In this example press-in elements are for example known which are pressed into matched bores of the plastic materials, normally at elevated temperatures of the material. The plastic material flows around the insert and into undercuts provided there and anchors the inserts in the cold state. The inserts can for example be provided with internal threads. Such inserts have indeed their justification but they are mainly only restrictedly loadable, because they could otherwise be pulled out of the plastic part or out of the plastic component. The use of such inserts is particularly problematic with relatively thin plastic components. Fastener elements are also known which take the form of a wire hoop with eyes at both ends of the wire hoop which are secured with a blind rivet to a component. A screw part which is rotatably journalled within a thin sheet metal mount or holder is secured to a further plastic part, likewise by means of blind rivets which secure the sheet metal mount or the holder to the plastic component. The screw has a cylindrical projection with bayonet-like grooves and can be secured by rotation through 90° to the wire hoop at the first component so that the wire hoop is received in the bayonet grooves, whereby the second component is attached to the first component. Such attachments are indeed expedient for thin components, such as panels in aircraft or sport cars which have to be quickly removed and reinstalled, the attachment itself however only permits a restricted clamping force. Also the riveted connections cannot be very highly loaded.

The object of the present invention is to provide a functional element which can be used with plastic components which enable relatively high strength connections to a further component irrespective of whether the further component is a plastic component or a component of metal, such as a sheet metal part or a solid part. Furthermore the functional elements should be able to be used in mass production and indeed without them suffering damage during transport as mass-produced goods which would make their ability to function questionable. Furthermore, in accordance with the invention, component assemblies should be provided using such a functional element and consisting of a functional element and a plastic component, which in operation enable high quality screw connections to further components. Moreover, a special die button and a method should be provided for the attachment of the functional element to a plastic component, whereby a system capable of functioning should be provided.

SUMMARY OF THE INVENTION

In order to satisfy these objects a functional element is provided in accordance with the invention consisting of metal having a flange of larger diameter forming attachment surface and having a centering section arranged within the attachment surface and extending away from the flange, wherein an adhesive which hardens under pressure is arranged around the centering section and adjacent to the attachment surface.

By accommodating the adhesive which cures under pressure around the centering section and adjacent to the attachment surface the adhesive is held after manufacture of the functional element, or during storage and transport, in a protected position, whereby damage to the adhesive deposit or the loss of the adhesive deposit or of a part of it need not be feared. Furthermore, the centering section ensures that the functional element is relatively accurately positioned relative to the plastic component and simultaneously forms a type of seal with the opening of the component as a result of the tight tolerances. As a result, on the application of pressure to the upper side of the functional element on the one hand and to the lower side of the component on the other hand, which is supported by a die button, the adhesive is exposed to the pressing pressure and can, so to say, not easily escape between the centering section and the opening. In this way, the required pressing force is achieved in the adhesive and the function of the adhesive which cures under pressure is not impaired.

After the attachment of the functional element to a component consisting of plastic the so generated component assembly is characterized in that the centering section extends into an aperture of the component and in that the adhesive forms a relatively large area adhesive connection between the connection surface and the surface of the plastic component opposite to it.

The adhesive is preferably a micro-encapsulated or a nano-encapsulated adhesive which preferably consists of two components, which are respectively accommodated in micro-capsules or nano-capsules and which are mixed together, with the capsules being capable of bursting under pressure loading, whereby the at least two components enter into contact and form a cured or hardened adhesive layer.

In an embodiment of the present functional element, prior to breaking open of the adhesive capsules, the adhesive adheres to at least one of the attachment surfaces and the centering section of the functional element.

By using such encapsulated adhesive components these can be present alongside one another in mixed form over a longer period of time without them reacting. Only a weak adhesive need be mixed with the micro-capsules which, on the one hand, holds the capsules against one another and, on the other hand, holds the mixed capsules in a corresponding deposit or in corresponding deposits at the fastener element by an adequate but relatively weak adhesive bond.

As an alternative to this system one component of the adhesive can be present in micro-encapsulated or nano-encapsulated form and the second component can, on the one hand, serve as a binder for the capsules but, on the other hand, also for the adhesive bonding of the capsules to the functional element. I.e. the second component itself serves for a relatively weak adhesive bond of the capsules to one another and to the functional element. On contact with the first component, which arises on bursting of the capsules, a high strength adhesive bond arises with the first component, with the plastic component and with the functional element.

This adhesive acting as a binder also contributes to the solution in which the adhesive deposit remains on the functional elements in protected positions and is thus not damaged. Furthermore, the provision of at least one component in small micro-capsules or nano-capsules lying alongside one another ensures that simply on bursting of the capsules the components are so mixed with one another that they react in orderly manner with one another and in the correct quantities in order to generate a rigid adhesive bond between the respective functional element and the plastic component.

It is particularly favorable when the adhesive is present in the form of a ring. In this way, it is possible to provide an adequate quantity of adhesive in a protected position. The ring shape makes it simpler to attach the adhesive by sticking to the respective functional elements because it can easily be pushed over the centering section.

The ring is preferably so designed that, when sectioned in a longitudinal plane including the longitudinal axis of the functional element the section essentially represents a triangle.

With such a design the ring can have a longer limb adjacent the attachment surface and a shorter limb adjacent to the centering section, with the longer limb and the shorter limb preferably forming a right angle between them.

This design is particularly preferred because the ring of adhesive is hereby extremely well protected by the centering section at one side and by the attachment surface at the other side. Because the hypotenuse of the triangle extends quasi from the centering section to the attachment surface, an oblique surface of the adhesive deposit is present here behind which all the adhesive is present in a protected manner.

As an alternative to the above-described ring-like design of the adhesive deposit the adhesive can also be arranged in individual adhesive deposits around the centering section and sticking to the latter or to the attachment surface of the flange.

It is particularly favorable when at least one recess which takes up excess adhesive is formed in the flange and/or in the centering section. Through the provision of the recess the excess adhesive which arises on attachment of the functional element to the component and which is of uncertain quantity for unpredictable reasons, such as tolerances and surface roughness, is able to escape without affecting the adhesive bond and without contaminating the component or the environment of the component. Such excess material is, on the one hand, desirable in order to ensure that the adhesive joint is fully filled with adhesive and that the desired strength of the adhesive bond is achieved. On the other hand, as a result of the inaccuracies in the metering of the adhesive deposit, due to tolerances in the dimensions of the functional element or of the plastic component that is used and due to fluctuations of the contact pressure, i.e. of the pressure which the adhesive "feels" and also due to an escape of adhesive along the centering section and/or from the flange section the quantity of excess material varies from case to case.

Since an adequate adhesive bond always arises in the adhesive joint that is provided, which is effectively ensured by the provision of an excess of adhesive or by the provision of a possibility of for the excess of adhesive, a high quality adhesive bond can always be generated so that one can be confident that the required strength of the adhesive bond is achieved and thereby the security against rotation of the functional element at the plastic component and the press-out resistance of the functional element from the plastic component.

The recess is preferably a ring recess which is provided radially inside the attachment surface as an axial groove in the flange or radially outside of the attachment surface or interrupting the latter. In this way the ring recess can serve as a radially outer limitation of the adhesive joint between the functional element and the plastic component and also makes the calculation of the adhesive bond, and thus of the bond strength and the security against rotation of the functional element at the plastic component, simple. It is however not essential to operate with a ring recess, but rather a plurality of recesses can be provided which are arranged within the attachment surface around the longitudinal axis of the functional element, for example recesses in the form of radially extending grooves. The recesses or ring recess can also be positioned at other points, for example the recess can be formed as an axial groove in the flange part directly adjacent to the centering section or as a radial groove in the centering section.

The centering section is circularly round and in particular also cylindrical in cross-section, because the functional element can then be introduced into a pre-manufactured circular hole in the plastic component and indeed without having to pay attention to particular orientation around the longitudinal axis of the hole. A hole of this kind can arise by drilling or can be pre-manufactured together with the plastic component during its shaping and manufacture, for example by a corresponding circular projection in the press mold or in the injection molding tool that is used. As indicated above, the diameter of the pre-manufactured hole in the plastic component is preferably selected to be so large that it corresponds to the outer diameter of the centering section whereby a very small gap or indeed no gap or indeed an interference force arises between the centering section and the margin of the hole. In this way the desired sealing function is ensured and the component is not contaminated by adhesive emerging at this point.

An arrangement is particularly favorable in which the attachment surface is arranged within a contact surface set back relative to the attachment surface in the axial direction of the centering section.

Through this arrangement, the functional element can be provided with an enlarged contact surface whereby the surface pressure at the plastic component which arises either during the attachment of the functional element to the component or after this on forming a screw connection with the functional element can always be kept so low that settling effects do not arise which would ultimately be deleterious for the quality of the screw connection. Furthermore, in this way, the thickness of the adhesive within the adhesive joint can be determined by the amount of the set-back, whereby the strength of the adhesive bond between the functional element and the plastic component is ensured. The total contact surface includes not only the ring-like contact surface outside of the attachment surface but rather also the attachment surface itself since the adhesive composition within the adhesive ring and adjacent to the contact surface is solid in the finished state of the component assembly and will not normally be more resilient than the plastic component. At least a design of this kind can be ensured by selection of the adhesive deposit.

In the last named arrangement it is particularly favorable when the contact surface forms an outer ring surface and when the attachment surface forms an inner ring surface, with a ring recess which preferably takes up excess adhesive being provided between the contact surface and the attachment surface. In a design of this kind the positioning of the ring recess or of the contact surface ensures that any excess adhesive cannot escape from the functional element and impair the plastic component or its appearance in an undesired manner.

As indicated, the functional element can be a nut element or a bolt element or a hollow element or an element with a cylindrical projection for receiving a shaft or a clip or a bearing sleeve.

It is particularly favorable when the functional element in accordance with the invention is provided in conjunction with the plurality of like functional elements, with the functional elements being arranged in one row or in a plurality of rows in a flexible carrier band and being capable of being buttoned out of the carrier band by bending of the latter.

This is a particularly favorable possibility for storing the functional elements and transporting them into the attachment tools and for releasing them from the carrier band. The carrier band can be present in strips which are accommodated in pre-prepared lengths in magazines and can thus be straightforwardly transported by machine in a feed device into the attachment tools for the functional elements. It is also possible to wind up the carrier band so that larger quantities of functional elements can be accommodated in a space saving and orderly manner. It is also conceivable not only to provide one row of functional elements in the carrier band but rather two, three or more rows alongside one another, depending on how many functional elements are to be released from the carrier band at one go and inserted by corresponding attachment devices into the plastic component.

The attachment of the functional elements in plastic components can take place with many different devices. It is conceivable to use a press for the attachment in which the functional element is pressed by means of a setting head from above onto the plastic component and indeed against a die button which is held in a lower tool of the press. That is to say the setting head can either be present in the upper tool of the press or in an intermediate plate of the press and the die button can then be held in the intermediate plate of the press or in a lower tool of the press respectively. Inverse arrangements are however also entirely possible, i.e. the setting head is located in the lower tool of the press or in an intermediate plate of the press, while the die button is arranged coming from above in the intermediate plate of the press or in the upper tool of the press respectively.

For each stroke of the press, one functional element, or a plurality of functional elements simultaneously, can be attached to the plastic component. The press can then be so set that it on the one hand closes to a dimension which is required in order to attach the functional elements in accordance with the invention to the plastic component and to exert an adequate pressure on the adhesive in order to ensure the adhesive function.

Another possibility lies in inserting the functional elements into a plastic component by attaching them to it by means of a robot. The robot can here for example carry a device similar to a setting head which presses the element onto the one side of the plastic component while the plastic component is pressed against a support or a die button which is likewise carried by the robot. Furthermore, a stationary device can be used for holding a die button and only the setting head actuated by the robot. An inverted arrangement would also be conceivable, i.e. the robot presses the die button onto the one side of the plastic component, the other side of which sits on a holder or on a setting head which, for example, supports the functional element. Moreover, it is possible to operate with tongs which press the plastic component and the element against one another or holds a die button on the one side of the plastic component and presses a functional element from the other side of the plastic component and onto the die button. Such functional elements can also be processed in a manual procedure, for example in that the plastic component is positioned onto a die button in a firm support, the functional element is then inserted from above with the centering section at the front into the preformed hole in the plastic component and the required pressing pressure is then generated by means of a percussion tool and, if required, also by means of a corresponding drift.

It is particularly favorable, when a die button is used during the manufacture of the components assembly which has a central projection whose radial outwardly facing surface is an inclined surface which is designed, in order, with a corresponding inclined surface of the central section, to support the latter or to reshape it and/or to dilate it and has a ring surface arranged around the central projection which presses against the lower side of the plastic part and exerts pressure on the adhesive via the plastic part.

In this way, an easy reshaping of the centering section takes place which serves above all to bring this into more intimate contact with the margin of the hole in the plastic component and to design the required sealing function in accordance with the invention in an orderly manner so that no adhesive escapes there. The degree of the reshaping of the centering section is not so pronounced here that one could speak of the formation of a rivet bead, particularly since the centering section preferably does not extend over the full height of the margin of the hole in the component but rather only over a part of this height. The inclined surface can also be formed by a rounded surface by which the centering section is slightly modified in its shape. Through a small dilation of the centering section the centering of the functional element relative to the hole in the plastic component can also be made more accurate. This has a positive effect in the assembly situation since then the alignment of the plastic component relative to a further component to be screwed into place or to a component to which the plastic component is to be screwed is improved. Through the minor dilation of the centering section it can also be ensured that the adhesive adjacent to the centering section is actuated by bursting of the micro-capsules. Furthermore, the dilation of the centering section can lead to a slightly divergent shape of the centering section in the direction away from the attachment surface and to a corresponding conical indentation of the plastic component which also brings about a mechanical latching between these parts.

The die button can in particular have a raised portion of ring shape within its end surface which leads to a ring-like recess in the side of the component remote from the flange and to a ring step at the surface of the component remote from the attachment surface with an area which corresponds to that of the attachment surface.

In this way, the axial height of the adhesive joint between the plastic component and the functional element can so to say be calibrated whereby the desired strength of the connection can also be made more reproducible.

The method for the attachment of the functional element is characterized in that on the attachment to the component the micro-capsules or nano-capsules are coursed to burst whereby the adhesive generates an adhesive connection between the attachment surface of the functional element and the oppositely disposed surface of the component and excess adhesive is optionally pressed out of the region of the adhesive connection, for example into a recess of the functional element or into a gap formed between the rounded side of the flange and the component

BRIEF DESCRIPTION OF THE FIGURES

The invention will subsequently be explained in more detail with reference to embodiments and to the drawings which show:

FIGS. 1A-1E a functional element in accordance with the invention in a half plan view from below (FIG. 1A) in a half sectioned side view (FIG. 1B) with an enlarged representation of the circled region of FIG. 1B (FIG. 1C), in a perspective representation (FIG. 1D) and with an enlarged perspective illustration of the circled region of FIG. 1D (FIG. 1E), FIGS. 2A-2C the attachment of the functional element of FIGS. 1A to 1C to a relatively thin component using a die button, with FIG. 2A showing the starting situation and FIG. 2B showing the finished component assembly, while FIG. 2C shows an enlarged representation of the circled region of FIG. 2B, FIG. 3A-3C drawings of a further embodiment in accordance with the invention similar to FIGS. 2A-2C, FIGS. 4A, 4B a modified component assembly in accordance with the invention with the FIG. 4B showing the circled region of FIG. 4A to an enlarged scale, FIG. 5 a schematic representation of the use of a carrier band in order to hold, to transport and to release a row of functional elements, FIG. 6 a centering bolt in accordance with the initially named German patent application which is however modified in accordance with the present invention.

DETAILED DESCRIPTION OF THE INVENTION

Figure 1A:
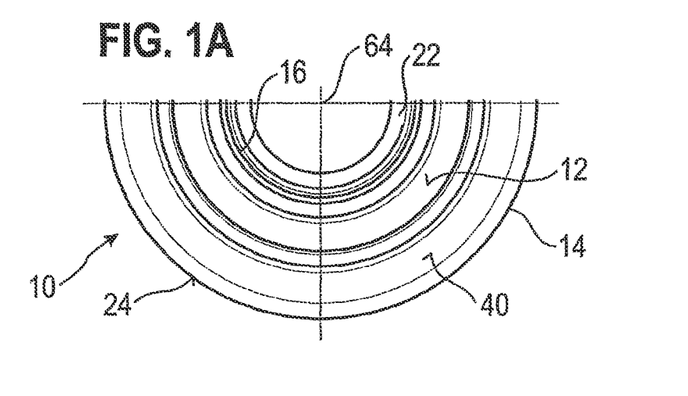
Figure 1B:
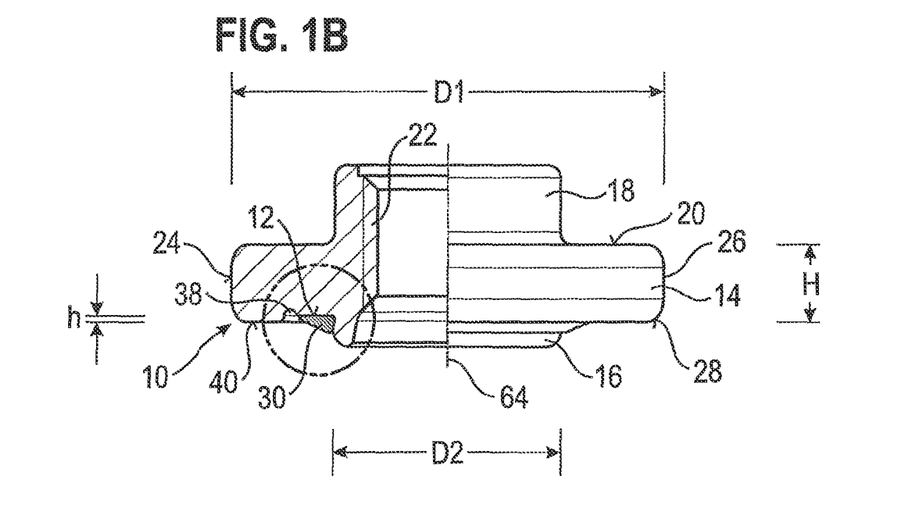
Figure 1C:
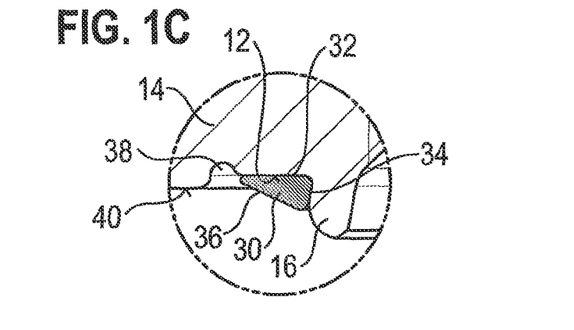
Figure 1D:
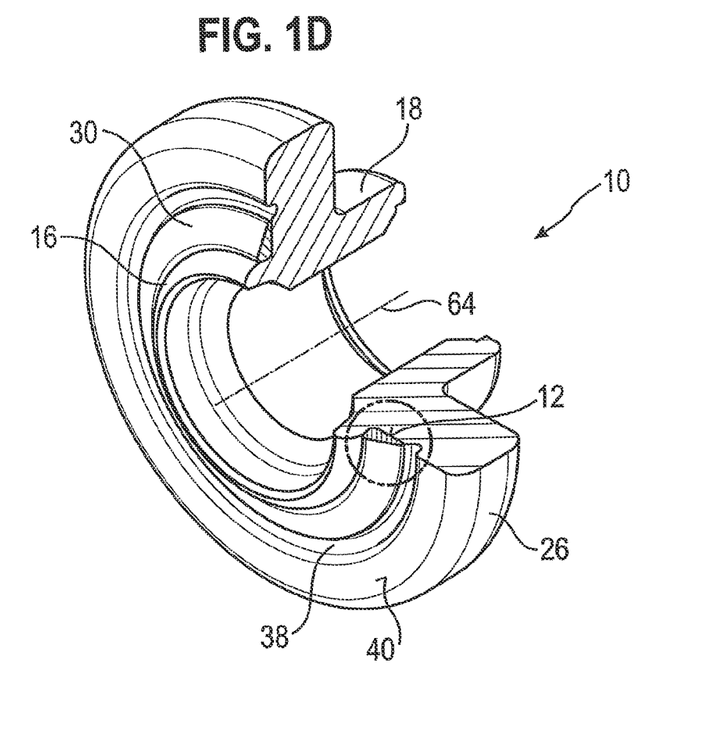

The FIGS. 1A-1C show a functional element 10 of metal having a flange 14 of large diameter D1 forming an attachment surface 12 and having a centering section 16 of smaller diameter D2 arranged within the attachment surface 12 and extending away from the flange.

Above the flange 14 and readily visible in FIG. 1B there is a cylindrical projection 18 which merges via a radius into an upper side of the flange in FIG. 1B. The ring surface 20 which arises forms a pressing surface which, on the attachment of the functional element 10 to a plastic component, serves for the application of the required pressing force. Through the provision of this ring surface 20 the thread 22 of the functional element 10 which is here formed as a nut element is protected against deformation by the pressing force. At the same time the axial height of the counter-levered flange part 14 can be reduced to the required dimension and hereby the weight of the functional element likewise reduced.

One can see that the outer peripheral surface 24 of the functional element has a rounded ball-like shape which arises automatically during the manufacture of the functional element in a cold heading process. This rounded shape is of advantage because, on the one hand, it saves weight and, on the other hand, also forms a gentle transition from the axially parallel region 26 of the outer peripheral surface of the flange into the lower side of the flange. The rounded transition 28 avoids undesired notches at the surface of the plastic component.

An adhesive 30 which cures on the pressure, is arranged adjacent the centering section and on the region of the lower side of the flange 14 here referred as the attachment surface 12.

The preferred adhesive is a micro-encapsulated and/or nano-encapsulated adhesive which preferably consists of at least two components which are respectively accommodated in micro-capsules and/or nano-capsules which are mixed with one another and also with a binder. The binder has the function of sticking the mixed micro-capsules to one another and to the functional element. The capsules are designed to burst under pressure loading, whereby the at least two components enter into contact, react and form a curing or hardening adhesive layer. As evident, the adhesive is present in the form of a ring.

Figure 1E:
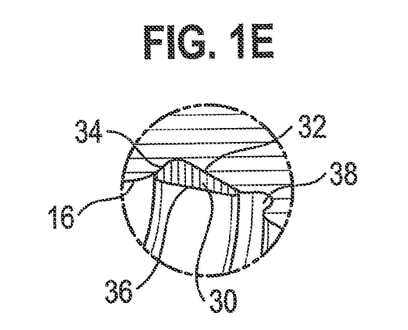

Furthermore one sees, in particular from FIGS. 1B, 1C and 1E that the adhesive ring 30 is at least substantially triangular when sectioned in a longitudinal plane including the longitudinal axis of the functional element.

The adhesive ring 30 has a longer limb 32 arranged adjacent to the attachment surface and a shorter limb 34 arranged adjacent to the centering section, with the longer limb 32 and the shorter limb 34 preferably forming a right angle between them. The adhesive ring 30 having a triangular shape in cross-section is protected by the attachment surface 22 on the one side and by the centering section 16 on the other side. Since the hypotenuse 36 of the triangular shape forms the boundary surface of the adhesive ring and lies within an imaginary conical oblique surface (not shown) which extends from the free end of the centering section 16 to the radially outer boundary of the attachment surface 12 the danger of injury, for example the breaking away of the adhesive ring or of a region of it, is very small and even then when the functional elements are transported loosely in bulk.

Alternatively to the arrangement of the adhesive in a ring shape, the adhesive can be arranged in individual adhesive deposits around the centering section sticking to the attachment surface of the flange.

A recess 38 which takes up excess adhesive is provided in the flange 14. A recess can alternative or additionally be formed in the centering section (not shown).

The recess 38 is, as shown, a ring recess which is formed radially outside of the attachment surface as an axial groove in the flange 14. Instead of this, the ring recess could also be arranged as a radio groove in the centering section 16 or radially inside the attachment surface or interrupting the latter.

Furthermore, the possibility exists, instead of providing a ring recess 38 (or as a supplement thereto (not shown)) to provide a plurality of recesses which are arranged inside the attachment surface and around the longitudinal axis of the functional element, for example recesses in the form of radially extending grooves.

In the FIGS. 1A to 1E the centering section is circularly round in cross-section and of ring-like form. It could however, if required, also have a polygonal or a grooved or ribbed shape.

One can see, in particular from FIG. 1B, that the attachment surface 28 is arranged radially inside a ring-like contact surface 40 and is set back relative to the later in the axial direction of the centering section 16 by an amount h, which amounts for example to about 0.1 mm. The contact surface 40 forms an outer ring surface and the attachment surface 28 forms an internal ring surface, with the ring recess 38 which accommodates the excess adhesive being provided between the contact surface 40 and the attachment surface 28.

Figure 6:
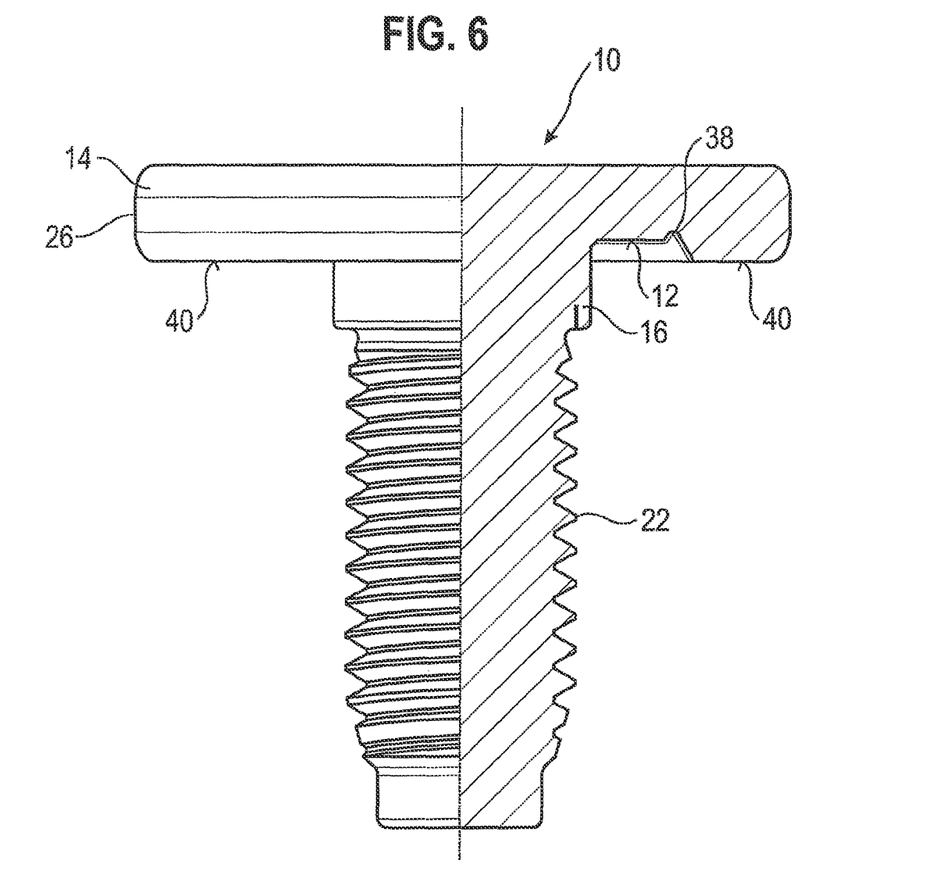
Figure 7:
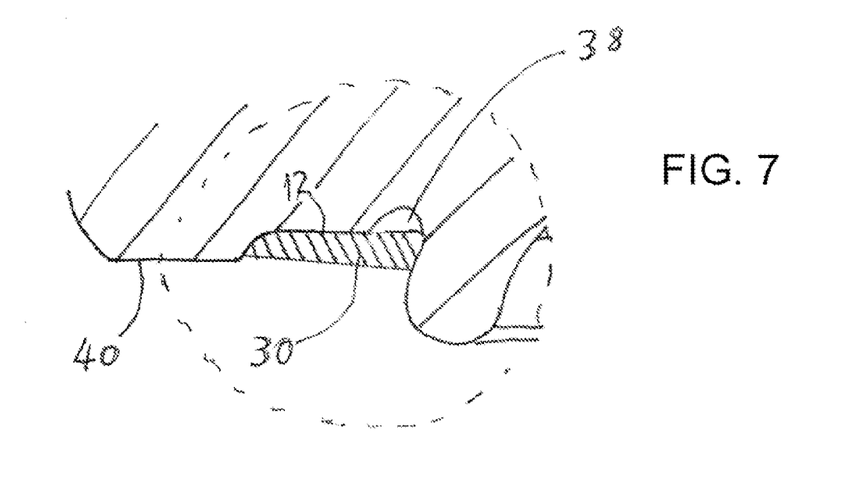
FIG. 7 a view similar to FIG. 1C but to an enlarged scale showing a variant of the invention in which the ring recess to accommodate excess adhesive is arranged as an axial groove radially inside the attachment surface.
Figure 8:
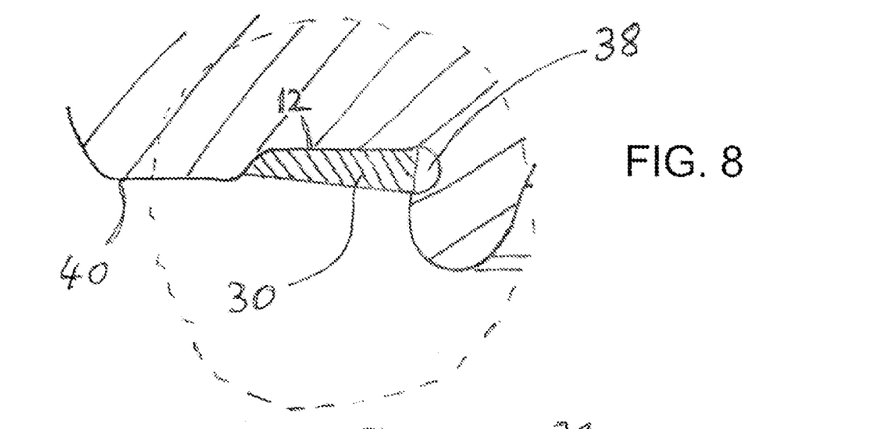
FIG. 8 is another view similar to FIG. 1C but to an enlarged scale showing a variant of the invention in which the ring recess to accommodate excess adhesive is arranged as a radial groove in the centering section, and FIG. 9 yet another view similar to FIG. 1C but to an enlarged scale showing a variant of the invention in which the ring recess to accommodate excess adhesive is arranged interrupting the attachment surface.
Figure 9:
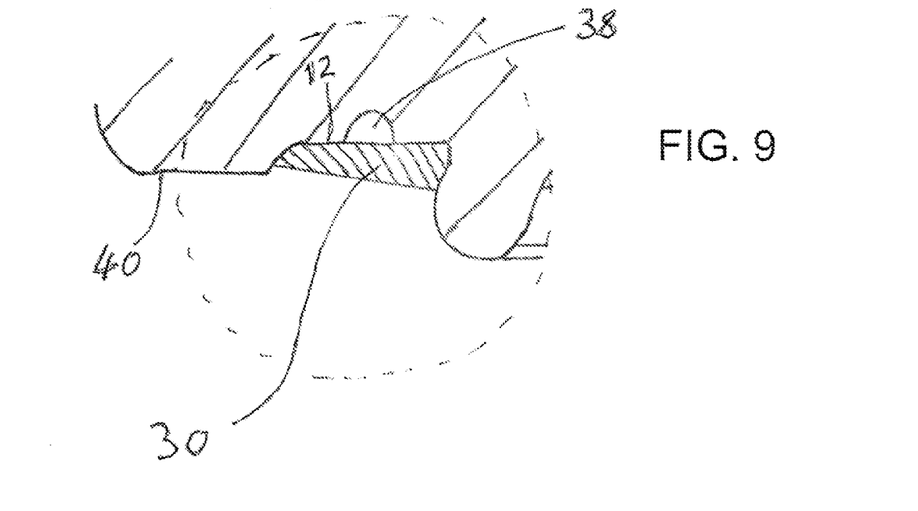

The function element 10 is formed in FIGS. 1A-1E as a nut element, it could however equally be formed as a bolt element as is shown in FIG. 6.

It will be understood that the previous description of FIGS. 1A to 1E also applies in transferred sense for the bolt element in accordance with FIG. 6 in which the same reference numerals are used and have the same significance.

Furthermore, the functional element could be formed as a hollow element or as an element with a cylindrical projection for receiving a shaft or a clip or a bearing sleeve (not shown).

Figure 2A:
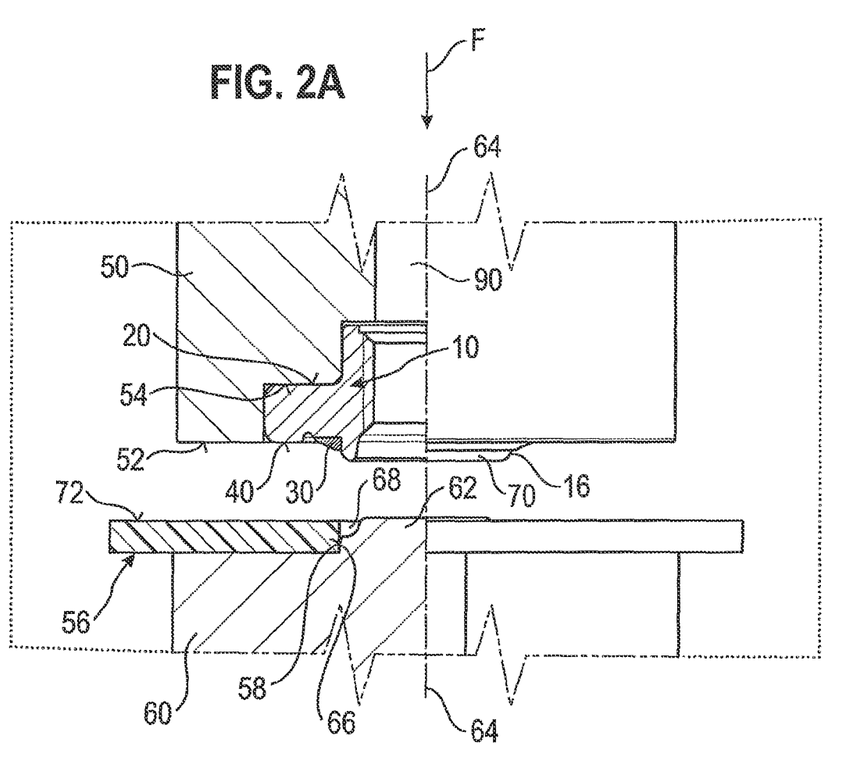

The FIG. 2A now shows the functional element 10 of FIGS. 1A to 1E in accordance with the invention within a holder 50 which can for example be formed as a setting head. Such setting heads are extremely well known in the field of fastener elements for use with the sheet metal parts and do not need to be explained further here.

One can see that the holder 50 of the setting head has a lower end face 52 and also a cutout 54 corresponding to the external shape of the functional element 10, with the cutout being so dimensioned that the contact surface 40 of the functional element 10 lies in a plane with the lower side 52 of the holder 50. Beneath the functional element 10 is located a plastic component which is supported on a die button 60. A hole 58 is present in the plastic component 56 with the margin of the hole defining an internal diameter which corresponds to the external diameter of a central projection 62 of the die button 60. This diameter likewise corresponds to the outer diameter D2 of the centering section 16 of the functional element 10. One can further see from FIG. 2A that the central projection 62 of the die button, the hole in the plastic component 56 and also the centering section 16 of the functional element 10 have a common central longitudinal axis 64. Thus the plastic component 56 also lies in this stadium concentric to the centering section 16 of the functional element. Furthermore, one can see from FIG. 2A that the central projection 62 of the die button in a lower region 66 of the central projection 62 serves for the centering of the plastic component 56 and in an upper region for the centering of the functional element 10. Above this lower ring-like region 66 there is located a ring-like cutout 68 of the central post 62 which has a form which deviates slightly from the shape of the lower region 70 of the centering section 16 so that this region of the centering section 16 is slightly compressed, slightly reshaped and fractionally dilated when the holder or the setting head 50 is pressed against the ring-like driven surface 20 of the functional element 10 in the direction of the arrow F. One can imagine the arrangement in accordance with FIG. 2A such that the die button 60 is centered in the lower tool of a press while the holder 50 or the setting head is arranged either in the intermediate plate of the press (if present) or in an upper tool of the press. On closing of the press, the holder 50 is thus moved towards the plastic component 56 and the die button 60, with the upper side 72 of the plastic component in the region around the hole 58 being pressed against the adhesive ring and also with the internal margin of the hole 58 scraping adhesive from the centering section 16 and hereby subjecting the adhesive ring 30 to pressure so that the components of the adhesive react together and are set under pressure and the adhesive cures. When using an adhesive with micro-encapsulated or nano-encapsulated components the capsules burst under the applied pressure and allow the corresponding components to enter into an intimate mixture with one another whereby the chemical curing reaction is triggered.

Figure 2B:
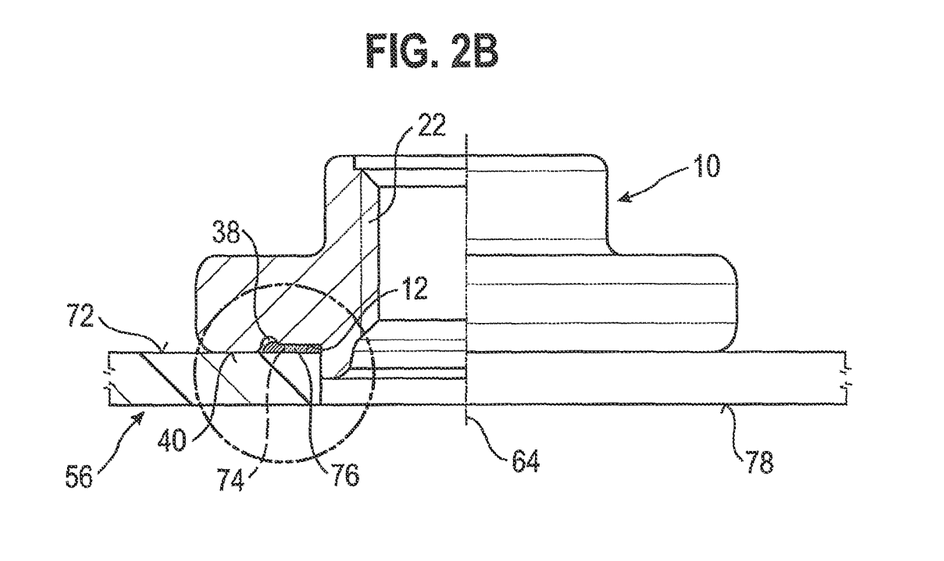
Figure 2C:
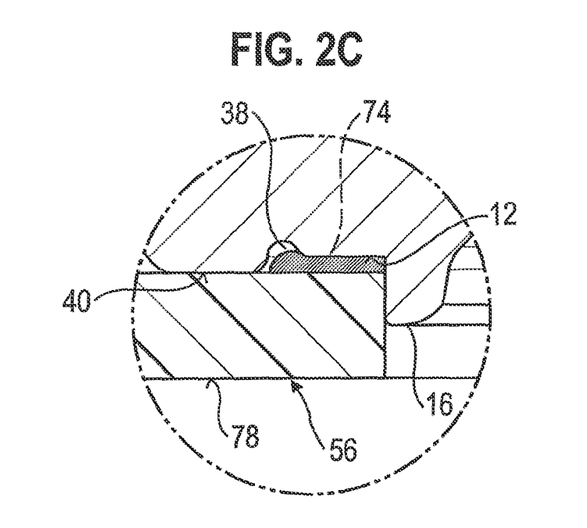

In this respect the accurate fitted shape of the outer surface of the centering section 16 and the margin of the hole of the opening or the aperture 58 of the plastic component ensure that no adhesive or only a very small quantity of adhesive runs past the centering section 16 i.e. this region is well sealed so that the adhesive is set under pressure in the now rectangular space 74 between the upper side of the plastic component and the attachment surface 38 of the functional element 10 and cures there, as is shown in FIGS. 2B and 2C. In this connection excess adhesive enters into the ring recess 38 around the attachment surface 38. one sees further from FIGS. 2B and 2C that the contact surface 40 of the functional element 10 likewise sealingly lies against the surface 70 of the plastic component 56 but does not however press into this or only to a small degree. Thus the axial height h in accordance with FIG. 1B also determines the axial thickness of the hardened or cured quantity of adhesive 76 which fills the rectangular space (in cross-section) 74.

One can further see from FIG. 2B and FIG. 2C that the end face of the slightly reshaped centering section 16 comes to lie approximate at the center of the plastic component and in any event does not project beyond the lower side 78 of the plastic component. Thus a planar attachment surface 78 is present beneath the plastic component at the side of the plastic component 56 remote from the flange 14. Since the centering section 16 is formed here as a ring-like centering section a screw can straightforwardly be screwed into the thread 22 of the nut element coming from below in FIG. 2B and hereby a further component can be pressed against the planar attachment surface. At the same time the contact surface 40 of the functional element is pressed against the upper side 72 of the plastic component, so that a high quality attachment situation is achieved with the desired direct clamping. Since the adhesive is cured in the adhesive joint 74 a part of the axial loading of the screw connection is transferred via the adhesive in the adhesive joint 74 to the attachment surface 12.

Figure 3A:
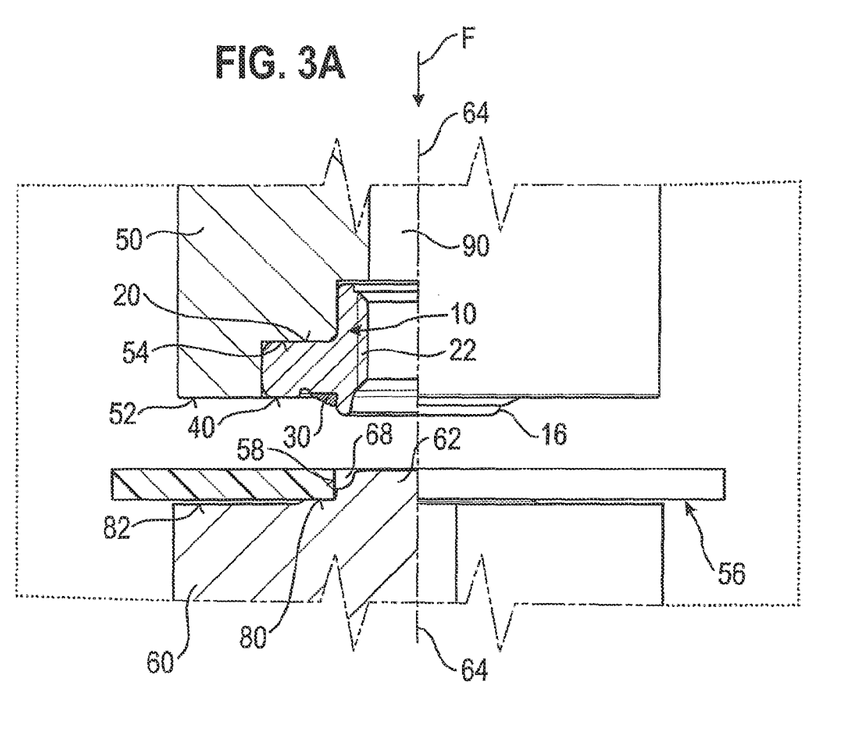
Figure 3B:
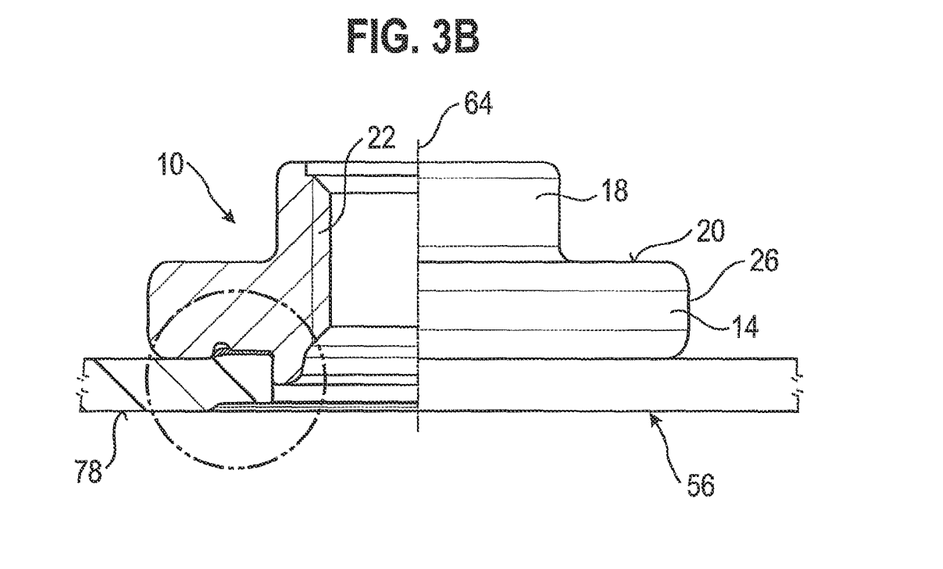
Figure 3C:
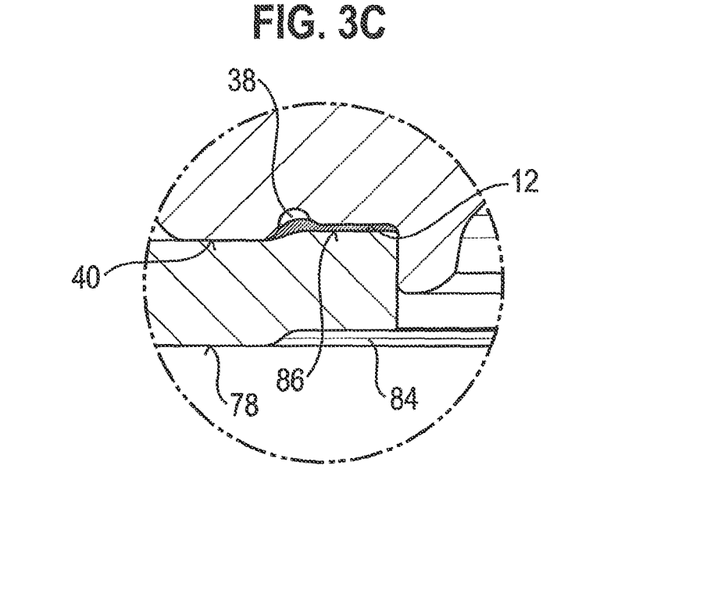

The FIGS. 3A to 3C show an embodiment which is very similar to the embodiment of FIGS. 2A-2C, which is why the same reference numerals are used in the corresponding drawings. It will be understood that the previous description also applies for components with the same reference numerals in FIGS. 3A-3C. This convention is also used in conjunction with the further Figures. The important differences between the embodiment in accordance with FIGS. 3A-3C in comparison to the FIGS. 2A-2C will now be described.

The differences are restricted the raised portion 80 of ring shape around the central projection 62 of the die button 60. One can see from FIG. 3A that a plastic component now sits on the upper side of the ring-like step 80 and is thus somewhat above the ring surface 82 of the die button which surrounds the raised portion 80 of ring shape. The situation in the holder 50 is unchanged relative to the previous embodiment in accordance with FIGS. 2A-2C.

As a results of the closing of the press or of another device which is used in order to press the functional element 10 against the plastic component and the die button 60, the raised portion 80 of ring shape of the die button forms a ring recess 84 in the lower side 78 of the plastic component and at the same time, as can be best seen from FIG. 3C, a corresponding raised portion 86 on the surface of the plastic component, whereby the axial height of the adhesive with the adhesive joint 74 is reduced relative to the embodiment of FIGS. 2B and 2C. This can be of advantage, since frequently, the adhesive force of adhesives increases with the reducing thickness of the adhesive layer providing this layer still has an appropriate thickness. The axial height of the raised portion 80 relative to the surface 82 can with advantage be selected in the range between 0.2 and 0.5 mm. The difference between the axial height of the contact surface 40 and the attachment surface 12 is then so selected that the axial height of the adhesive layer in the region 74 amounts to approximately 0.1 mm if one takes account of the axial height of the raised portion 86 which approximately amounts to the axial height of the recess 84 or of the ring surface 80 relative to the surface 82.

In many plastic materials it is possible, to bring about such a permanent deformation by a ring step 80 of a die button 60.

Figure 4A:
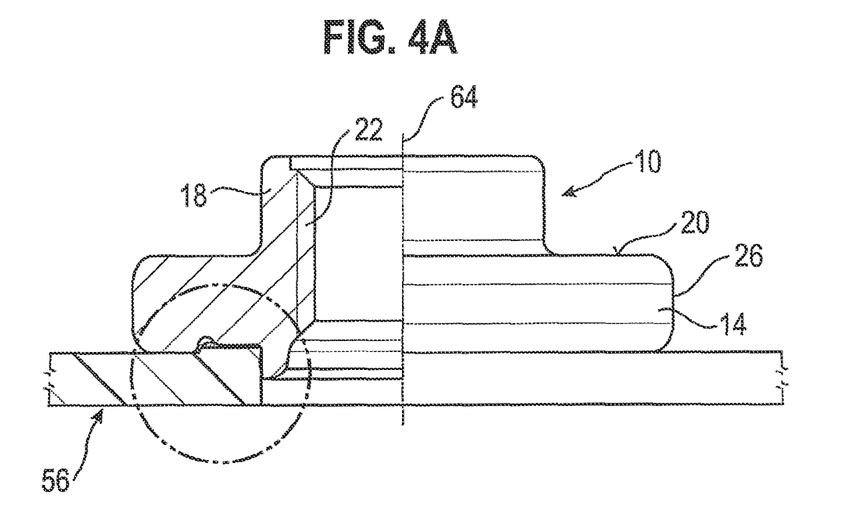
Figure 4B:
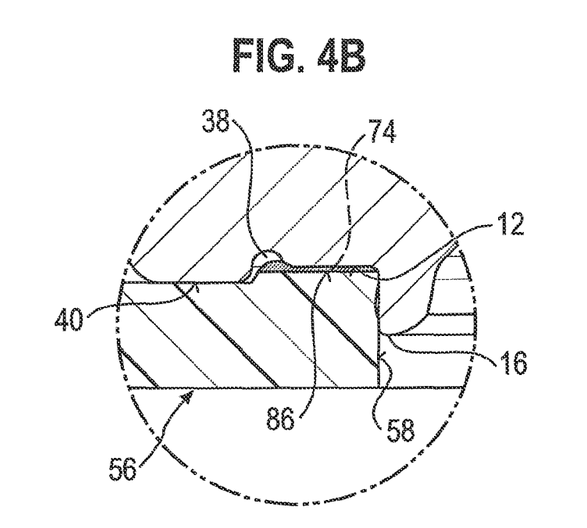

In the event that this does not succeed or that it must be feared that the material of the plastic component would be hereby damaged in an impermissible manner, one can also provide—in the design of the plastic component—for a raised portion of ring shape at the plastic component, such as for example shown in FIGS. 4A and 4B. This embodiment also has the advantage that a reinforcement of the plastic component is present in the region around the hole 58, whereby a loading of the screw connection or loadings which occur in operation can be better fed into the plastic component 56.

Even if one does not operate with a raised portion of ring shape of this kind, one can in any event accurately determine the axial height of the adhesive joint and of the adhesive layer which forms here in that the axial height h (FIG. 1B) is correctly determined, i.e. the degree of the set-back of the attachment surface 12 relative to the contact surface 40 is correctly selected.

At this point it should be pointed out that the hollow design of the holder 50 in accordance with FIG. 2A or 3A can be exploited so that a central longitudinal passage 90 is present there in order, by means of a longitudinally displaceable plunger in the passage 40, to press the finished component assembly away from the holder 50 after the component assembly has been finished.

Figure 5:
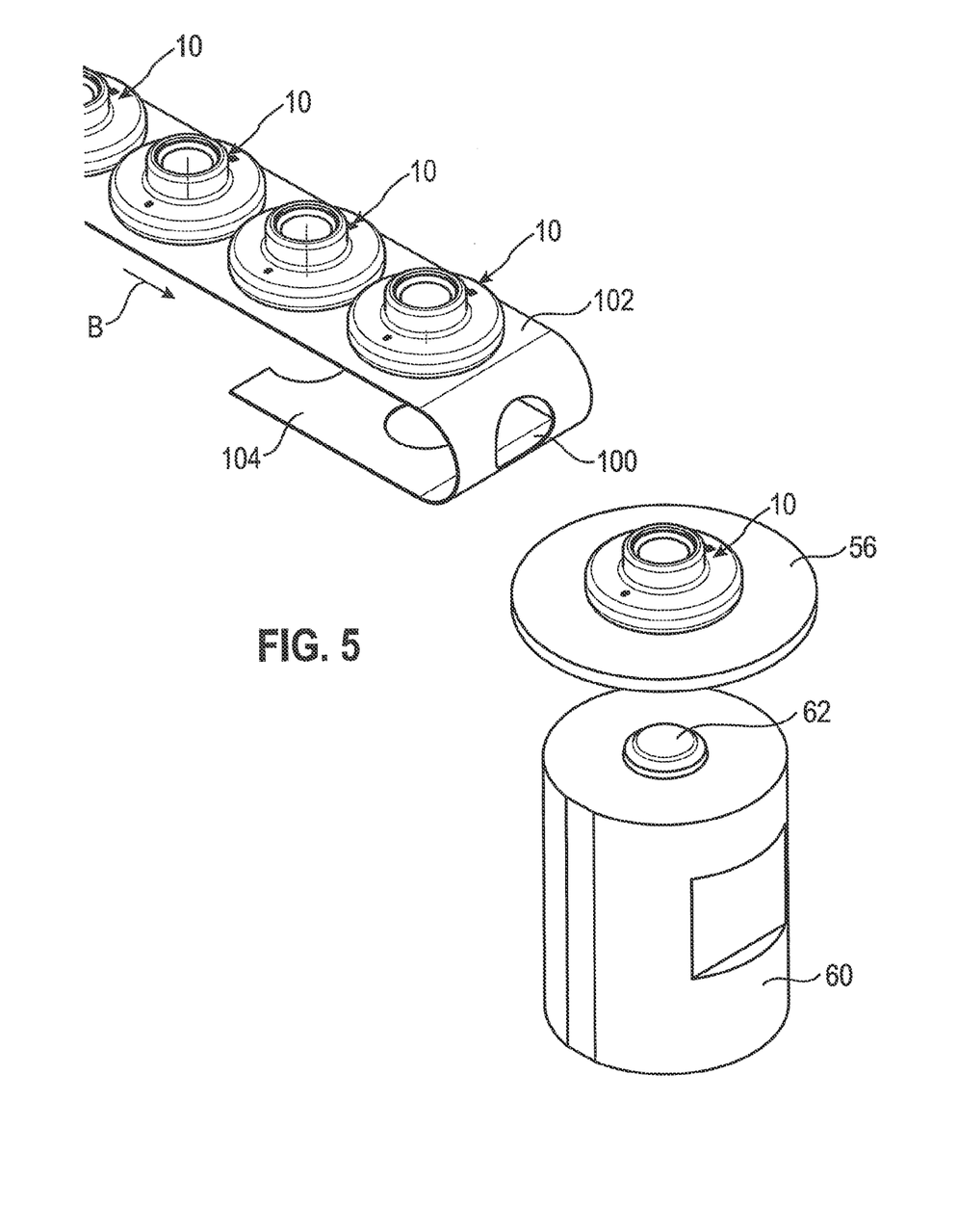

FIG. 5 now shows how individual functional elements 10 can be inserted into corresponding openings 100 of a carrier band 102 so that the functional elements are arranged one after the other in a row. If necessary, a plurality of rows of openings 100 can be provided in the carrier band so that plural rows of functional elements are also possible. By folding the carrier band back on itself, as is shown in 104, for example over a non-illustrated shaft, the functional elements 10 are buttoned out of the carrier band one after the other on movement of the carrier band 102 in the arrow direction B and they can then be moved into a feed passage of a setting head or to a position above a die button 60 by means of a movable finger or of a holder (both not shown) which directly receives the functional element, as schematically shown in FIG. 5. FIG. 5 shows however the situation after the attachment of the plastic component 56.

A large number of different types of adhesives is known for the connection of various components. The different types of adhesive can be classified on the one hand by their chemical bases and on the other hand by their solidification mechanism. For chemically hardening adhesives, often also termed reaction adhesives, the individual chemical components for the adhesive are introduced in the correct ratio into the adhesive joint. The solidification is achieved by chemical reaction of the components with one another. Basically, one distinguishes for reaction adhesives between two (or multi) component systems and single-component systems. In the present application, any kind of reaction adhesives can be used and for the sake of simplicity will be termed in the following as adhesives.

For two component adhesives two often spatially separated preparations are used. Monomers, the basic building stones of the polymer arising during the reaction, are present in these preparations. One of the two preparations contains resin monomers (binder) whereas the other contains hardever. Further content materials can also be present in the preparations, such as for example stabilizers, thixotropic agents, accelerators, further additives, dyes or fillers. The two components must typically be mixed in the correct ratio with one another prior to the application. On contact of the binder and the hardener, the chemical reaction to form the adhesive polymer starts. This signifies that two component adhesives can only be processed within a certain processing time. Through the progressive reaction, the viscosity of the mixture continuously increases and can finally no longer join the two surfaces to be joined to one another after exceeding the processing time if these surfaces have not yet been brought together. After the connection of the surfaces by means of the adhesive, the curing time follows in which the end strength of the adhesive bond builds up. This curing time is affected greatly by external influences, in particular by the temperature. A temperature increase leads to an accelerated curing and often also to higher strength. In contrast to this, lower temperatures prolong the curing time. Three or multi-component adhesives are also manufactured which can be used as required.

Typical types of two (or multi) components and single-component systems are cyanacrylate adhesives, methylmethacrylate adhesives, anaerobically curing adhesives, radiation curing adhesives, phenol formaldehyde resin adhesives, epoxy resin adhesives and polyurethane adhesives.

With the special requirements which are placed on a functional element it is important to provide an adhesive composition in non-cured form at the functional element and indeed in such a way that the functional element with the non-cured adhesive can be stored over a longer period of time for days, through months up to years, without the adhesive curing. Known are also adhesive systems in which the individual components are present in micro-capsules or nano-capsules. The following types of systems are possible:

a) One component of the adhesive, the first component, is introduced in micro-capsules or nano-capsules into the second component, with the second component being designed so that it bonds the micro-capsules and nano-capsules to one another and bonds these to the functional element. The second component does not however harden (or cure) without contact with the first encapsulated component, but rather the second component functions as a weak adhesive, similar to the adhesive in adhesive notices. Only when the micro or nano-capsule burst, is the first component released into the second component so that the two components enter into contact and cure and a high adhesive force is developed.

b) Both components of the two component adhesive are respectively accommodated in micro- or nano-capsules and these are then mixed with a third component, with the third component having the task of keeping the first and second encapsulated components together and of bonding them onto the functional element. Only a small quantity of the third component is used, just so much as is necessary to achieve the above-designated functions but not so much that the presence of the third component prevents a high quality adhesive bond arising by reactions between the first and the second compound until the capsules have been broken open under pressure.

c) Multi-component adhesives can also be used which are each respectively accommodated in micro-capsules or nano-capsules and then react with one another when the capsules (as in the above examples) are caused to burst by the action of pressure. A binder must also be provided with such multi-component adhesives which holds the individual capsules together in mixed form and binds them to the respective functional element.

An example for a three component adhesive would be an epoxy resin as a first component, an epoxy resin polymeric compound as the second component and a hardener, for example in the form of a peroxide as the third component.

The invention claimed is:

1. A functional element (10) of metal having a flange of a first diameter (D1) there being an attachment surface (12) at one side and having a centering section (16) of a smaller diameter than the first diameter arranged radially inside the attachment surface (12) and extending away from said one side of the flange in the axial direction of the functional element, wherein a ring of an adhesive (30) which hardens under pressure is arranged around the centering section (16) and adjacent to the attachment surface (12), wherein at least one recess (38) is provided which accommodates excess adhesive resulting when the adhesive hardens under pressure and wherein the recess (38) is a ring recess which is arranged in at least one of the following ways:
   as a radial groove in the centering section (16) or
   radially outside of the attachment surface (12);
   and wherein the flange further comprises a contact surface (40) that forms an outer ring surface and the attachment surface (12) is arranged radially inside the contact surface and is set back relative to the contact surface in the axial direction (64) of the functional element.

2. A functional element in accordance with claim 1, wherein the adhesive (30) is at least one of a micro-encapsulated or a nano-encapsulated adhesive comprising first and second components which are accommodated in respective capsules, the capsules being mixed with one another and being able to be broken open under pressure loading, whereby the said first and second components enter into contact and form a hardened adhesive layer.

3. A functional element in accordance with claim 2 wherein, prior to breaking open of the capsules, the adhesive adheres to at least one of the attachment surface and the centering section.

4. A functional element in accordance with claim 2, wherein, prior to breaking open of the capsules, the adhesive adheres to at least one of the attachment surface and the centering section by means of a bonding agent which also holds the capsules together.

5. A functional element in accordance with claim 1, wherein the ring of adhesive (30) is triangularly shaped when viewed in a cross section which includes a central axis of the functional element.

6. A functional element in accordance with claim 5, wherein the cross section has a side facing the attachment surface (12) which is longer than a side facing the centering section (16).

7. A functional element in accordance with claim 1 wherein the centering section (16) is cylindrical, ring-shaped or polygonal or has a grooved or ribbed form.

8. A functional element in accordance with claim 1 in the form of one of a nut element, a bolt element, a hollow element or an element having a cylindrical projection for receiving one of a shaft, a clip or a bearing sleeve.

\* \* \* \* \*